UNITED STATES PATENT OFFICE 2,361,456

SUBSTITUTED DIOXANES

Henry C. Chitwood, Charleston, W. Va., assignor to Carbide and Carbon Chemicals Corporation, a corporation of New York No Drawing. Application June 17, 1942,
Serial No. 447,453

12 Claims. (Cl. 260—338)

This invention relates to a new class of dioxane derivatives and to a process for preparing them.

Although the synthesis of diethers of dihydroxydioxane, such as the dialkoxydioxanes, by the condensation of dichlordioxane with alcohols is known, the preparation of the tetraethers of tetrahydroxydioxanes has not heretofore been known. These latter compounds contain at least six oxygen atoms in ether linkages, and are powerful solvents for oils, waxes, resins, and cellulose derivatives.

The tetraethers of tetrahydroxydioxane are obtained by condensing glyoxal with a monohydric alcohol according to the process herein described. Since glyoxal is more readily obtainable in association with water than as monomeric glyoxal, the invention will be described with reference to this source of glyoxal. Glyoxal forms a hydrate with water, and the exact constitution of this hydrate is not known. It is probable that the simplest hydrates $$\begin{array}{cc} \text{CHO} & \text{CH—(OH)}_2 \\ | & \text{and} \quad | \\ \text{CH(OH)}_2 & \text{CH—(OH)}_2 \end{array}$$

are in equilibrium with cyclic polymeric hydrates. The formation of these polymeric hydrates may involve the elimination of part of the water associated with the hydrate as follows:

(1)
$$2\begin{array}{c}\text{CHO}\\|\\\text{CHO}\end{array} + 4\text{H}_2\text{O} \longrightarrow$$

Glyoxal  Water

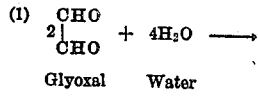

As more water is removed, further polymerization of the cyclic hydrates may occur.

When a monohydric alcohol is added to such a system, glyoxal hemi-acetals,

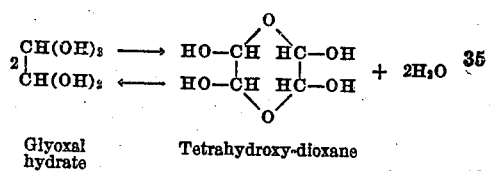

are initially formed, where R is the residue of the monohydric alcohol. Upon heating such mixtures with removal of water, glyoxal tetra-acetals may be formed by further acetalization of these hemi-acetals. Favorable conditions for this reaction include the use of a large excess of alcohol, for instance, 8 to 10 mols of alcohol per mol of glyoxal, as described in the application of MacDowell and McNamee, Serial No. 383,929, filed March 18, 1941.

If from 2 to 7 mols of the alcohol per mol of glyoxal are employed, the formation of the tetrasubstituted dioxanes will be favored. The formation of these latter compounds may be accounted for by several hypotheses, although the mechanism of the reaction which occurs in the formation of these substituted dioxanes is not known for certain. It is possible that the glyoxal and alcohol first react to form a glyoxal di-hemiacetal, which condenses with itself to yield the tetra-alkoxydioxane according to the following scheme:

(2) $4\text{ROH} + 2\text{OHC—CHO} \longrightarrow 2\text{ROCH(OH)CH(OH)OR}$

Alcohol  Glyoxal  Glyoxal di-hemiacetal (3)
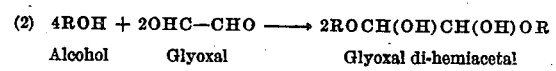

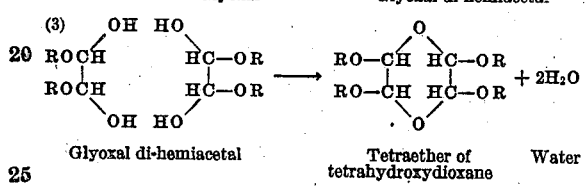

Glyoxal di-hemiacetal  Tetraether of  Water
tetrahydroxydioxane

On the other hand, it is possible that the alcohol condenses with the tetrahydroxydioxane form of the glyoxal hydrate in the following manner:

(4)
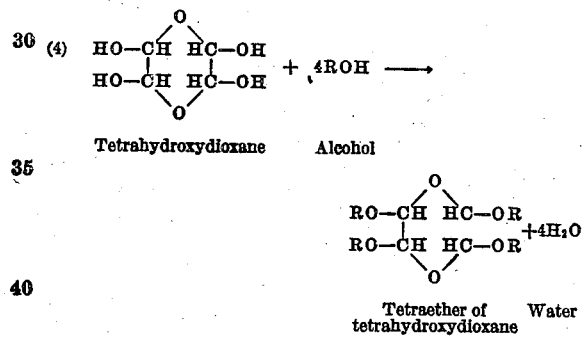

Tetrahydroxydioxane  Alcohol

Tetraether of  Water
tetrahydroxydioxane

Whatever reaction mechanism may account for the formation of the tetraethers of tetrahydroxydioxane, the following over-all equation may be written:

(5)
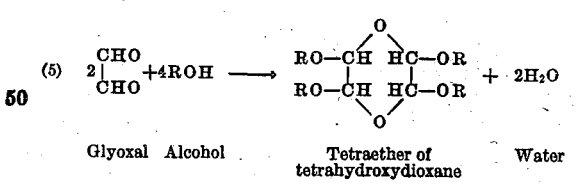

Glyoxal  Alcohol  Tetraether of  Water
tetrahydroxydioxane

Although a mixture of acetals will probably be obtained in any case, the formation of the desired tetra-substituted dioxanes may be increased by the removal of not more than one mol of water per mol of glyoxal, in addition to the use of the proper molar ratio of alcohol to glyoxal. In any event, the condensation is discontinued before 2 mols of water per mol of glyoxal have been split out in the condensation, in order to prevent the formation of preponderant quantities of the glyoxal tetra-acetals. Where glyoxal hydrates, polymers, hydrated polymers, or dehydrated polymeric hydrates of glyoxal are involved, the molar ratios specified are based on the aldehyde reactivity of these glyoxal equivalents, calculated as monomeric glyoxal. Furthermore, these molar ratios are based on the amount of material within the reaction zone, and the replenishment of unreacted alcohol which has distilled over with the water is not considered to increase the total ratio of alcohol to glyoxal in the reaction.

The reaction is preferably carried out with moderate heating of the reactants in the presence of an acid catalyst, such as sulfuric acid. The water of reaction may be removed as an azeotropic distillate with an inert, volatile liquid, such as benzene, toluene, xylene or diisopropyl ether. The water may also be removed by distillation of the reactants under a vacuum. When the theoretical amount of water has been removed, the catalyst is neutralized and the products separated by distillation.

The by-products which may be formed in the reaction, such as glyoxal diacetals and glyoxal tetra-acetals, as well as any high-boiling complex acetals, may be reacted with additional alcohol in the presence of an acid catalyst to increase the yield of tetra-substituted dioxanes. These acetals may serve as a source of glyoxal through hydrolysis in such reprocessing, or an acetal interchange may occur towards the formation of the most stable acetal.

The reaction is applicable to both aliphatic and aromatic alcohols, and in one case, tetra-alkoxydioxanes are formed, and in the other, tetra-aralkoxydioxanes result. Examples of suitable aliphatic monohydric alcohols include methanol, ethanol, isopropanol, butanol, tertiary butyl alcohol and chlorethyl and chlorisopropyl alcohol, as well as higher aliphatic alcohols, such as n-hexyl, 2-ethyl butyl, heptyl, n-octyl, and 2-ethyl hexyl alcohols. Unsaturated alcohols, such as allyl and crotyl alcohols may also be used. Alcohol-ethers, such as methoxy-ethanol, ethoxyethanol and butoxyethanol may be employed to form even more highly etherified products. Suitable aromatic alcohols include benzyl alcohol, phenyl ethyl carbinol, phenyl ethyl alcohol, and cinnamyl alcohol. Cyclic alcohols, such as cyclohexanol and cyclopentanol, and heterocyclic alcohols, such as furfuryl alcohol may also be employed. It is to be understood that the invention is not limited to alcohols having hydrocarbon groups attached to the hydroxyl group, and alcohols which contain substituents in the radicals attached to the hydroxyl groups are included within the scope of the invention, provided that the hydroxyl group in such compounds is alcoholic.

The invention is of broad scope as to the tetra-ethers of tetrahydroxydioxane with monohydric alcohols. This group is claimed as an entirely new class of chemical compounds, and all the compounds coming within that class are part of this invention.

The practice of the invention may be shown by the following examples:

Example 1

Six hundred and fifty-five (655) grams of a 49.6% aqueous solution of glyoxal (containing 5.6 mols of glyoxal in the form of its hydrate) were evaporated under reduced pressure until a swollen, amorphous solid was obtained. This solid represents a dehydrated polymeric hydrate of glyoxal. To this solid was added 1425 grams (31 mols) of ethanol, 0.5 c. c. of concentrated sulfuric acid as a catalyst, and 250 c. c. of benzene. The mixture was placed in a flask having a distillation column and heated under reflux. The water formed was removed as an azeotropic distillate with benzene. Upon distilling the reaction products, a 31% yield of a liquid identified as tetraethoxydioxane was obtained. In addition, glyoxal tetraethyl acetal and glyoxal semidiethyl acetal were obtained. Tetraethoxydioxane boils at 114° to 117° C. at 6 mm., possesses a specific gravity of 1.036 at 20° C., and has a refractive index of 1.4243 at 20° C. The molecular refraction calculated from the density and refractive index is 65.3, whereas the theoretical value for the bonds in tetraethoxydioxane is 65.2.

Example 2

A mixture of 1309 grams of 49.5% aqueous glyoxal (11.16 mols), 2300 grams of ethanol (50 mols), 500 c. c. of benzene and 2 c. c. of concentrated sulfuric acid was refluxed in a still fitted with a decanter. The lower layer of the distillate containing alcohol and water was removed and the top layer returned to the column. After 23 hours, 1400 grams of the lower layer had been decanted. A fresh portion of ethanol (1000 grams) was added and the refluxing was continued for 9 hours. By this time the lower layer was forming in the distillate very slowly. The benzene and excess ethanol were then distilled off at atmospheric pressure until a kettle temperature of 150° C. was reached. The distillation was then continued under vacuum. Three products distilled and were approximately separated into these fractions: 59 grams boiling at 40° to 65° C. at 10 mm. of mercury absolute pressure, 79 grams boiling at 65° C. at 10 mm. to 100° at 5 mm., and 164 grams boiling at 100° to 130° C. at 5 mm. These three fractions consisted principally of glyoxal diethyl acetal, glyoxal tetraethyl acetal, and tetraethoxydioxane, respectively. The respective yields were 5.4%, 3.4%, and 11.2%. The remaining 80% of the original glyoxal was in the form of complex higher acetals which were left in the kettle as a large residue.

The ability to increase the yield of desired product by acetal interchange was demonstrated by the following experiment:

The glyoxal diethyl acetal and glyoxal tetraethyl acetal cuts from the previous experiment were added to the kettle residue of high boiling acetals. Sixteen hundred and seventy (1670) grams of ethanol, 500 c. c. of benzene and 1 c. c. of concentrated sulfuric acid were added. The mixture was refluxed for 45 hours, during which time 300 grams of the lower layer of the distillate were decanted. The product was fractionated as before. The amounts of glyoxal diethyl acetal, glyoxal tetraethyl acetal, and tetraethoxydioxane obtained corresponded to yields of 6.6%, 26.8%, and 30.5% respectively, based on the glyoxal originally used. The total yield of tetraethoxydioxane was thus increased to 41.7% of the theoretical value. A residue of only 257 grams of high-boiling acetals remained, corresponding to about 23% of the original glyoxal. By additional reprocessing of this residue and of the lower boiling products, the yield of tetraethoxydioxane may be further increased.

*Example 3*

An experiment similar to that in Example 1 was conducted with isopropyl alcohol instead of ethanol. In addition to the di- and tetra-isopropyl acetals of glyoxal there was obtained a substantial amount of a compound boiling at 100° C. at 1.2 mm. mercury to 115° C. at 1.6 mm. Its refractive index was 1.4238 at 20° C. and its specific gravity was 0.976 at 20° C. It was identified by its molecular weight and molecular refraction as tetraisopropoxydioxane. (Molecular weight found by Menzies-Wright method, 324.6; theoretical, 320.4. Molecular refraction calculated from density and refractive index, 83.80; theoretical for bonds in tetraisopropoxydioxane, 83.75.)

The term "glyoxal" as employed in the appended claims is intended to include all glyoxal equivalents which react like glyoxal, such as the hydrates, polymers, hydrated polymers, and dehydrated polymeric hydrates of glyoxal.

I claim:

1. As new chemical compounds, 2,3,5,6-tetraethers of tetrahydroxydioxane with monohydric alcohols.

2. As new chemical compounds, 2,3,5,6-tetraaralkoxydioxanes.

3. As new chemical compounds, 2,3,5,6-tetraalkoxydioxanes.

4. As a new chemical compound, 2,3,5,6-tetraethoxydioxane.

5. As a new chemical compound, 2,3,5,6-tetraisopropoxydioxane.

6. Process for making tetraethers of tetrahydroxydioxane with monohydric alcohols which comprises condensing glyoxal with a monohydric alcohol, removing water from the zone of reaction during the condensation, continuing the condensation until substantially less than two mols of water per mol or glyoxal have been split out, and recovering from the reaction products a 2,3,5,6-tetraether of tetrahydroxydioxane with a monohydric alcohol.

7. Process for making tetraethers of tetrahydroxydioxane with monohydric alcohols which comprises condensing glyoxal with a monohydric alcohol, removing water from the zone of reaction during the condensation, the molar ratio of alcohol to glyoxal being at least 2 to 1 and not greater than 7 to 1, continuing the condensation until substantially less than two mols of water per mol of glyoxal have been split out, and recovering from the reaction products a 2,3,5,6-tetraether of tetrahydroxydioxane with a monohydric alcohol.

8. Process for making tetra-alkoxydioxanes which comprises condensing glyoxal with an aliphatic monohydric alcohol, removing water from the zone of reaction during the condensation, continuing the condensation until about one mol of water per mol of glyoxal has been split out, and recovering a 2,3,5,6-tetra-alkoxydioxane from the reaction products.

9. Process for making tetra-alkoxydioxanes which comprises condensing glyoxal with an aliphatic monohydric alcohol in the presence of an acid catalyst and a volatile aromatic hydrocarbon, distilling water from the zone of reaction during the condensation as an azeotropic distillate with said volatile aromatic hydrocarbon, the molar ratio of alcohol to glyoxal being at least 2 to 1, and not greater than 7 to 1, continuing the condensation until substantially less than two mols of water per mol of glyoxal have been split out, and recovering a 2,3,5,6-tetraalkoxydioxane from the reaction products.

10. Process for making 2,3,5,6-tetraethers of tetrahydroxydioxane with monohydric alcohols which comprises condensing glyoxal with a monohydric alcohol, removing water from the zone of reaction during the condensation, continuing the condensation until substantially less than two mols of water per mol of glyoxal have been split out, thereafter separating said tetraethers from other acetal products of the reaction, and heating these acetal products with additional amounts of the monohydric alcohol in the presence of an acid catalyst to form additional amounts of said tetraethers, and recovering said tetraethers from the reaction products.

11. Process for making 2,3,5,6-tetraethoxydioxane which comprises condensing glyoxal with ethanol, removing water from the zone of reaction during the condensation, continuing the condensation until substantially less than two mols of water per mol of glyoxal have been split out, and recovering said tetraethoxydioxane from the reaction products.

12. Process for making 2,3,5,6-tetraisopropoxydioxane which comprises condensing glyoxal with isopropanol, removing water from the zone of reaction during the condensation, continuing the condensation until substantially less than two mols of water per mol of glyoxal have been split out, and recovering said tetraisopropoxydioxane from the reaction products.

HENRY C. CHITWOOD.

Certificate of Correction

Patent No. 2,361,456.  October 31, 1944.

HENRY C. CHITWOOD

It is hereby certified that errors appear in the printed specification of the above numbered patent requiring correction as follows: Page 1, second column, lines 35 to 40, for

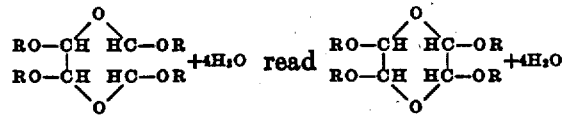

page 3, first column, line 49, for the words "mol or" read *mol of*; and that the said Letters Patent should be read with these corrections therein that the same may conform to the record of the case in the Patent Office.

Signed and sealed this 23rd day of January, A. D. 1945.

[SEAL]

LESLIE FRAZER,
*Acting Commissioner of Patents.*